(12) United States Patent  (10) Patent No.: US 7,597,384 B2
Wallman et al.  (45) Date of Patent: Oct. 6, 2009

(54) ENGINE COMPARTMENT HOOD LATCH STRUCTURE FOR A MOTOR VEHICLE

(75) Inventors: Mattias Wallman, Varberg (SE); Gunnar Hallneus, Gothenburg (SE); Peter Blum, Partille (SE); Anders Fredriksson, Gothenburg (SE); Mats Erlingfors, Jorlanda (SE); Peter Lindmark, Hisings backa (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/209,575

(22) Filed: Sep. 12, 2008

(65) Prior Publication Data

US 2009/0091158 A1    Apr. 9, 2009

(30) Foreign Application Priority Data

Oct. 3, 2007   (EP)   ................................. 07117828

(51) Int. Cl.
*B60R 21/34* (2006.01)
(52) U.S. Cl. ................ 296/187.04; 296/187.09; 296/193.1; 296/193.11; 180/69.2
(58) Field of Classification Search ........... 296/187.03, 296/187.04, 187.09, 193.1, 193.11; 180/69.2, 180/274, 281, 68.4, 68.6
See application file for complete search history.

(56) References Cited

U.S. PATENT DOCUMENTS 5,385,212 A    1/1995   Cady et al.
6,824,199 B2 *  11/2004  Weik et al. ............. 296/187.04
7,008,006 B2 *  3/2006   Steinhauser et al. ...... 296/181.2
7,455,351 B2 *  11/2008  Nakayama et al. ....... 296/193.1
2004/0251716 A1*  12/2004  Choi et al. ............. 296/187.03
2005/0194821 A1*  9/2005   Brown et al. ........... 296/193.11
2005/0211484 A1*  9/2005   Ellerman ................... 180/69.2
2006/0237998 A1*  10/2006  Andre et al. ........... 296/193.11
2007/0235237 A1*  10/2007  Wallman et al. ........... 180/69.2
2008/0238143 A1*  10/2008  Geyrhofer et al. ...... 296/187.03

FOREIGN PATENT DOCUMENTS

| DE | 10102187 |   | 8/2002 |
|----|----------|---|--------|
| EP | 1302388  |   | 4/2003 |
| EP | 1595755  |   | 11/2005 |
| EP | 1642786  |   | 4/2006 |
| FR | 2897812  |   | 8/2007 |
| JP | 2008105497 | A * | 5/2008 |
| KR | 2002049797 | A * | 6/2002 |

* cited by examiner

*Primary Examiner*—Jason S Morrow
(74) *Attorney, Agent, or Firm*—Dickinson Wright PLLC; Greg Brown

(57) ABSTRACT

A hood latch structure (1) for a motor vehicle body having a soft-nose outer skin panel (2) and a hood (3) providing an overlying structure for a grille opening reinforcing front cross member (4). The grille opening reinforcing front cross member (4) supports at least one hood latch (5) carried by a mounting member (6) protruding towards the front of the vehicle. Mounting member (6) is designed to collapse downwards (Z) causing the hood latch (5) to move downwards (Z) when subjected to longitudinal (X) loads above a predetermined threshold load distributed thereupon by the overlying structure such that the hood latch (5) moves away to provide a forgiving upper leg impact zone for the protection of pedestrians in the event of a collision with the motor vehicle.

6 Claims, 4 Drawing Sheets

ENGINE COMPARTMENT HOOD LATCH STRUCTURE FOR A MOTOR VEHICLE

CROSS REFERENCE TO RELATED APPLICATIONS

This application claims the benefit of European Patent Application 07117828.9 which was filed on Oct. 3, 2007.

BACKGROUND OF THE INVENTION

1. Field of the Invention

The present invention relates to an engine compartment hood latch structure for a motor vehicle body having a soft-nose outer skin panel and a hood providing an overlying structure for a grille opening reinforcing front cross member.

2. Related Art

Pedestrian safety is an important issue with an ever increasing number of vehicles on our roads. Many pedestrian crashes involve a forward moving vehicle, such as a car. During such a crash, a standing or walking pedestrian is struck by the front part of the vehicle and accelerated to the speed of the vehicle and then continues forward as the vehicle brakes to a halt. In such a crash the front part of the vehicle, particularly the leading edge of the engine compartment hood, often hits the upper leg, e.g. thigh or pelvis, of the pedestrian, potentially causing limb injuries.

In a pedestrian vehicle crash situation it is desirable that the pedestrian's contact with the vehicle be as "forgiving" as possible, so as to minimize injury to the pedestrian. However, at the same time the front part of the vehicle has to withstand a number of demands during daily use, such as the vehicle being pushed and persons sitting thereupon. Furthermore, when the engine compartment hood is closed, it should be securely latched in its closed state in order to prevent the hood from being opened by relative wind and vibrations during operation of the vehicle. In the event of a collision with a pedestrian, the hood should be deformed in a predetermined manner in order to mitigate the impact. It is therefore important that the hood latch structure be capable of retaining the engine hood in a closed state during a collision.

Solutions are known that adopt the passive shape of the front part of the vehicle, according to a so-called "soft nose" configuration often constructed from a thermoplastic material, which partially also will serve to mitigate collisions with pedestrians. By "soft nose" is often referred to a front bumper cover which meets the hood at a rearward position. However, some problems may remain, e.g. that the energy created by the impact is not absorbed in a sufficient manner so as to reduce the range of injuries and also that any rigid underlying structures, e.g. conventional hood latches, cause injuries when impacted. In order to mitigate the contact between an impacted pedestrian and an underlying hood latch structure it is known to provide deformation zones in the overlying structure, usually the hood, which zones, however, are disadvantageous from a packaging aspect as they add to the required space between the outer panel of the vehicle and the latch structure.

It would be desirable to provide an improved pedestrian safety hood latch structure for a vehicle body that may eliminate, or at least reduce, the problems described above.

SUMMARY OF THE INVENTION

According to a first aspect of the present invention, an engine compartment hood latch structure for a motor vehicle body having a soft-nose outer skin panel and a hood providing an overlying structure for a grille opening reinforcing front cross member, with the grille opening reinforcing front cross member supporting at least one hood latch carried by a second member protruding towards the front of said vehicle, with the second member being designed to collapse downwards, causing the hood latch to move downwards when subjected to longitudinal loads above 0.6 kN distributed thereupon by the overlying structure such that the hood latch moves away to provide a forgiving upper leg impact zone for the protection of pedestrians in the event of a collision with the motor vehicle.

DETAILED DESCRIPTION OF THE PREFERRED EMBODIMENT

Figure 1:
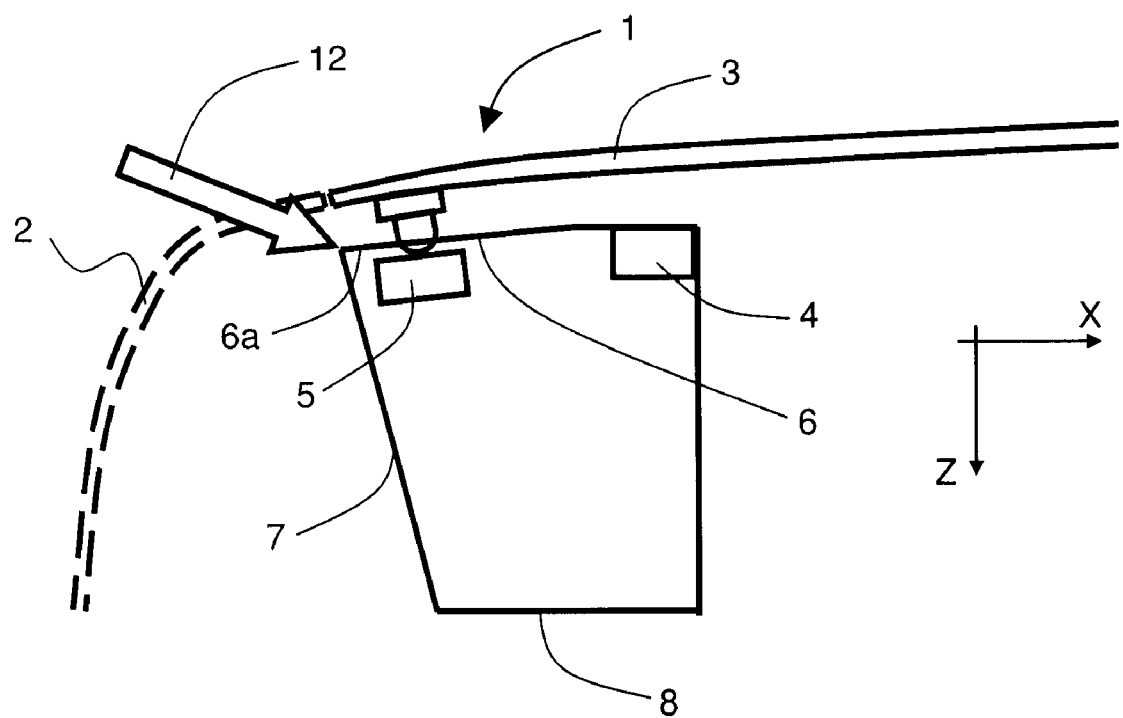
FIG. 1 schematically illustrates a front part structure of a motor vehicle body being provided with the pedestrian safety hood latch structure in accordance with a first embodiment of the present invention in a side view.

As shown in FIG. 1, the present invention relates to a pedestrian safety structure, 1, for motor vehicle bodies having soft-nose outer skin panels 2 (in dashed lines) arranged in front of grille opening reinforcing front cross member 4. As used herein, the term "soft-nose" refers to a front bumper cover which meets the hood, 3, of the vehicle at a rearward position, the soft-nose often being constructed from a plastic or composite material providing a deformable structure which is advantageous from a production aspect but also will help mitigate collisions with pedestrians.

Hood latch structure 1, as illustrated in FIG. 1, includes soft-nose outer skin panel 2 and a hood 3, which provides an overlying structure for grille opening reinforcing front cross member 4. Grille opening reinforcing front cross member 4 supports at least one hood latch, 5 carried by a mounting member, 6, which is protruding towards the front of the vehicle. In the case of several hood latches 5 each will be carried by a respective mounting member 6. Mounting member 6 is designed to collapse downwards, i.e. in the Z direction, causing the hood latch 5 to move downwards when subjected to longitudinal loads, i.e. in the X direction, above 0.6 kN distributed thereupon by the overlying structure, such that the hood latch 5 moves away to provide a forgiving upper leg impact zone for the protection of pedestrians in the event of a collision with the motor vehicle. However, longitudinal loads, i.e. in the X direction, below 0.6 kN, e.g. as caused by the vehicle being pushed backwards by one or more persons pushing at the surrounding structure, such as the soft-nose outer skin panel 2 or the vehicle hood 3, should not cause the hood latch 5 mounting member 6 to collapse downwards A supporting member, 7, is arranged between a forward end, 6a, of hood latch 5 mounting member 6 and an underlying vehicle structure, 8. Supporting member 7 is designed to support vertical loads, i.e. in the Z direction, distributed upon hood latch 5 mounting member 6 by the overlying structure in the range of 1.0-1.5 kN, in order to accommodate for persons sitting at the overlaying structure, such as the soft-nose outer skin panel 2 or hood 3. Supporting member 7 is further designed to collapse, causing hood latch 5 mounting member 6 to collapse and hood latch 5 to move downwards therewith, upon mounting member 6 being subjected to longitudinal loads above 0.6 kN distributed thereupon by the overlying structure.

Mounting member 6 is suitably made from sheet metal or other material having similar properties. Furthermore, mounting member 6 should preferably be about as wide as or slightly wider than hood latch 5 in a vehicle transverse direction, i.e. a direction Y orthogonal to the drawing sheet. The width of mounting member 6 in a vehicle transverse direction is suitably in the range of 0.05-0.15 m. Supporting member 7 is suitably also made from sheet metal or other material having similar properties.

Figure 2:
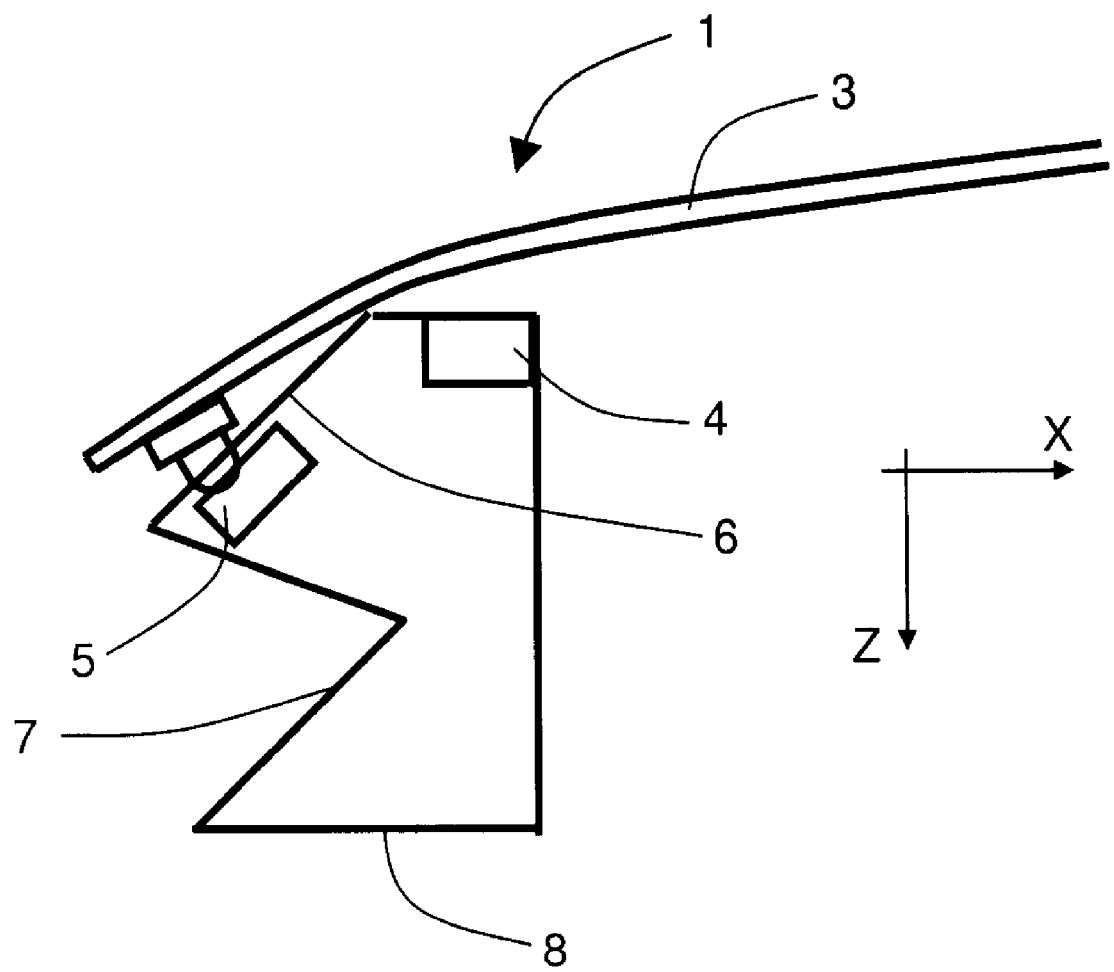
FIG. 2 schematically illustrates the front part structure of a motor vehicle body of FIG. 1 during impact with a pedestrian's upper leg.

FIG. 2 illustrates the behavior of a hood latch structure 1 in accordance with the FIG. 1 embodiment when impacted during a collision with a pedestrian. For clarity the soft-nose outer skin panel 2 is not shown in this figure. Plastic deformation of supporting member 7 and mounting member 6 is clearly observable; these deformations position hood 3 in a pedestrian accommodating configuration.

Figure 3:
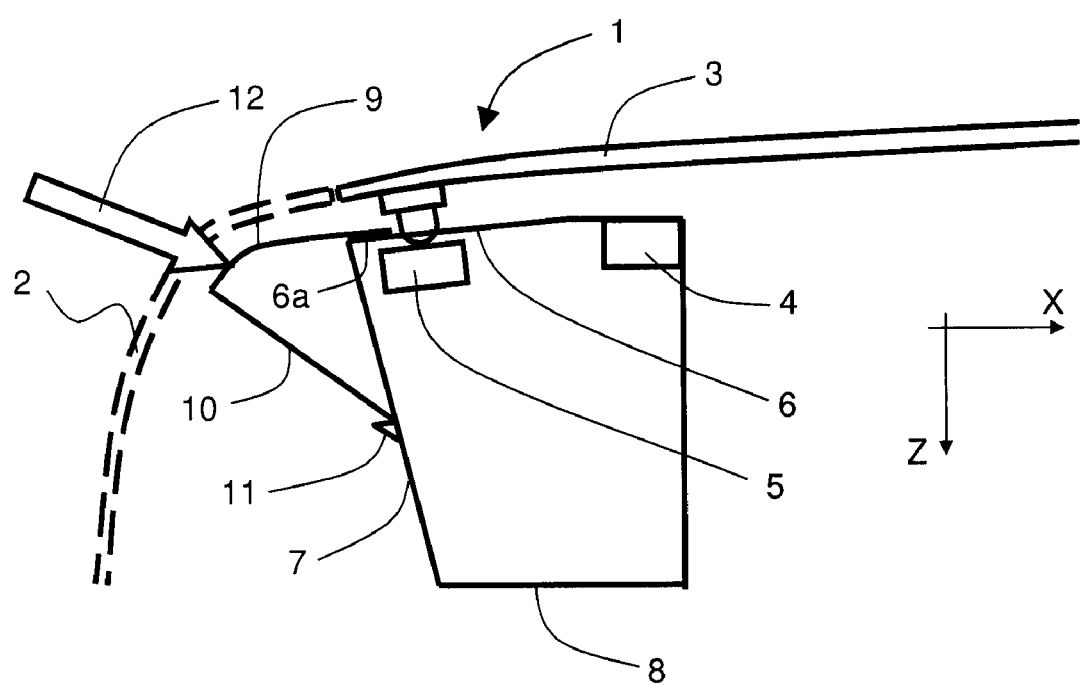
FIG. 3 schematically illustrates a front part structure of a motor vehicle body being provided with the pedestrian safety hood latch structure in accordance with a second embodiment of the present invention in a side view.

As illustrated in FIG. 3, a reinforcing energy beam 9 may alternatively be arranged between the soft-nose outer skin panel 2 and hood latch mounting member 6. Energy beam 9 carries a trigger, 10, which is arranged such that it will be brought into contact with supporting member 7 and trigger collapse thereof in the event of a pedestrian collision with the motor vehicle. Energy beam 9 will thereby provide for earlier upper leg engagement in the case of a collision between the motor vehicle and a pedestrian. The earlier upper leg engagement allows the crash energy from the pedestrian upper leg to trigger earlier distancing of the potentially harmful hood latch 5.

Energy beam 9 may alternatively be attached to one or more of: the soft-nose outer skin panel 2; the grille opening reinforcing front cross member 4 through a weak connection; or mounting member 6. For ease of assembly during manufacturing of the vehicle, energy beam 9 may be sub-assembled in soft-nose outer skin panel 2. Energy beam 9 may be made from steel, aluminium, suitable metal alloys or plastic or combinations thereof.

Supporting member 7 is provided with a stopper, 11, arranged to receive the trigger 10 and prevent it from sliding off during contact with the supporting member. Supporting member 7 is preferably designed to support upwards directed loads, i.e. in the −Z direction, upon the hood latch 5 mounting member 6 applied via the hood latch 5 up to 3 kN.

Figure 4:
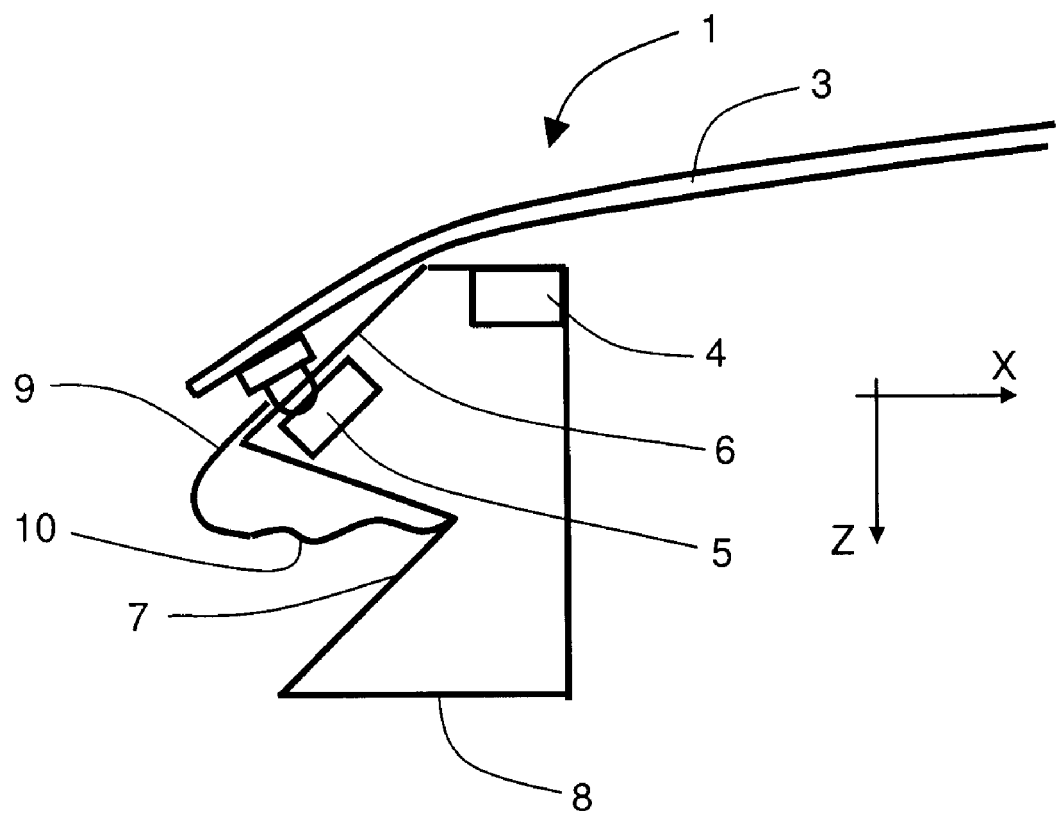
FIG. 4 schematically illustrates the front part structure of a motor vehicle body of FIG. 3 during impact with a pedestrian upper leg.

FIG. 4 illustrates the behavior of hood latch structure 1 in accordance with the FIG. 3 embodiment when impacted during a collision with a pedestrian. For clarity soft-nose outer skin panel 2 is not shown in FIG. 4.

Mounting member 6 and supporting member 7 should further preferably be designed for energy absorbing deformation when subjected to the forces resulting from an impact with a pedestrian upper leg. Such an impact will usually occur downwards, as illustrated by arrow 12 in FIGS. 1 and 3, at an angle between 0 and 35° to the longitudinal X direction. In such a scenario of a collision between the motor vehicle and a pedestrian the hood latch structure 1 will provide an energy absorbing upper leg impact zone for the protection of the pedestrian impacted.

Thus, through this proposed hood latch structure 1 arranged between the overlying structure and the grille opening reinforcing front cross member 4, a local deformation is enabled that minimizes the involved mass and thereby also provides for a reduced upper leg reacting force in the event of a pedestrian collision with a motor vehicle. The design of the hood latch structure 1 is such that a collision with a pedestrian upper leg is mitigated by virtue of the potentially harmful hood latch 5 structures being collapsed and the hood latches 5 distanced from the impacted pedestrian. Furthermore, this arrangement promotes the energy absorption during impact through providing appropriate deformation room for the surrounding energy absorbing structures.

Modifications to embodiments of the invention described in the foregoing are possible without departing from the scope of the invention as defined by the accompanying claims.

Numerals included within parentheses in the accompanying claims are intended to assist understanding of the claims and should not be construed in any way to limit subject matter claimed by these claims.

What is claimed is:

1. A hood latch structure (1) for a motor vehicle body having a soft-nose outer skin panel (2) and a hood (3) providing an overlying structure for a grille opening reinforcing front cross member (4), comprises at least one hood latch (5) carried by a mounting member (6) attached said front cross member and protruding towards the front of said vehicle, said mounting member (6) being designed to collapse downwards (Z) causing hood latch (5) to move downwards (Z) when subjected to longitudinal (X) loads above a predetermined threshold distributed thereupon by said overlying structure such that said hood latch (5) moves away to provide a forgiving upper leg impact zone for the protection of pedestrians in the event of a collision with the motor vehicle, with said hood latch structure further comprising a supporting member (7) extending between a forward end of mounting member (6) and an underlying vehicle structure (8), and with a reinforcing energy beam (9) extending between said soft-nose outer skin panel (2) and said mounting member (6), which energy beam (9) carries a trigger (10) which is configured such that it will be brought into contact with supporting member (7) and trigger collapse thereof in the event of a pedestrian collision with the motor vehicle.

2. A hood latch structure (1) according to claim t, wherein said predetermined threshold load is approximately 0.6kN.

3. A hood latch structure (1) according to claim 1, wherein said supporting member (7) is designed to support vertical (Z) loads distributed upon mounting member (6) by said overlying structure in the range of 1.0-1.5 kN, with said supporting member (7) further being designed to collapse, causing mounting member (6) to collapse and said hood latch (5) to move downwards (Z) therewith, upon said member (6) being subjected to longitudinal (X) loads above 0.6kN distributed thereupon by said overlying structure.

4. A hood latch structure according to claim 1, further comprising stopper (11) attached to supporting member (7), with said stopper (11) arranged to receive said trigger (10) and prevent it from sliding off during contact with said supporting member (7).

5. A hood latch structure according to claim 4, wherein said supporting member (7) is designed to support upwards (−Z) directed loads upon said mounting member (6) by said hood latch (5) up to 3 kN.

6. A hood latch structure according to claim 1, wherein said mounting member 6 has a width in a vehicle transverse direction which is proximate the width of hood latch (5).

* * * * *